July 15, 1941.  F. E. LANGE  2,249,215
TEMPERATURE CONTROL SYSTEM
Filed Oct. 7, 1938
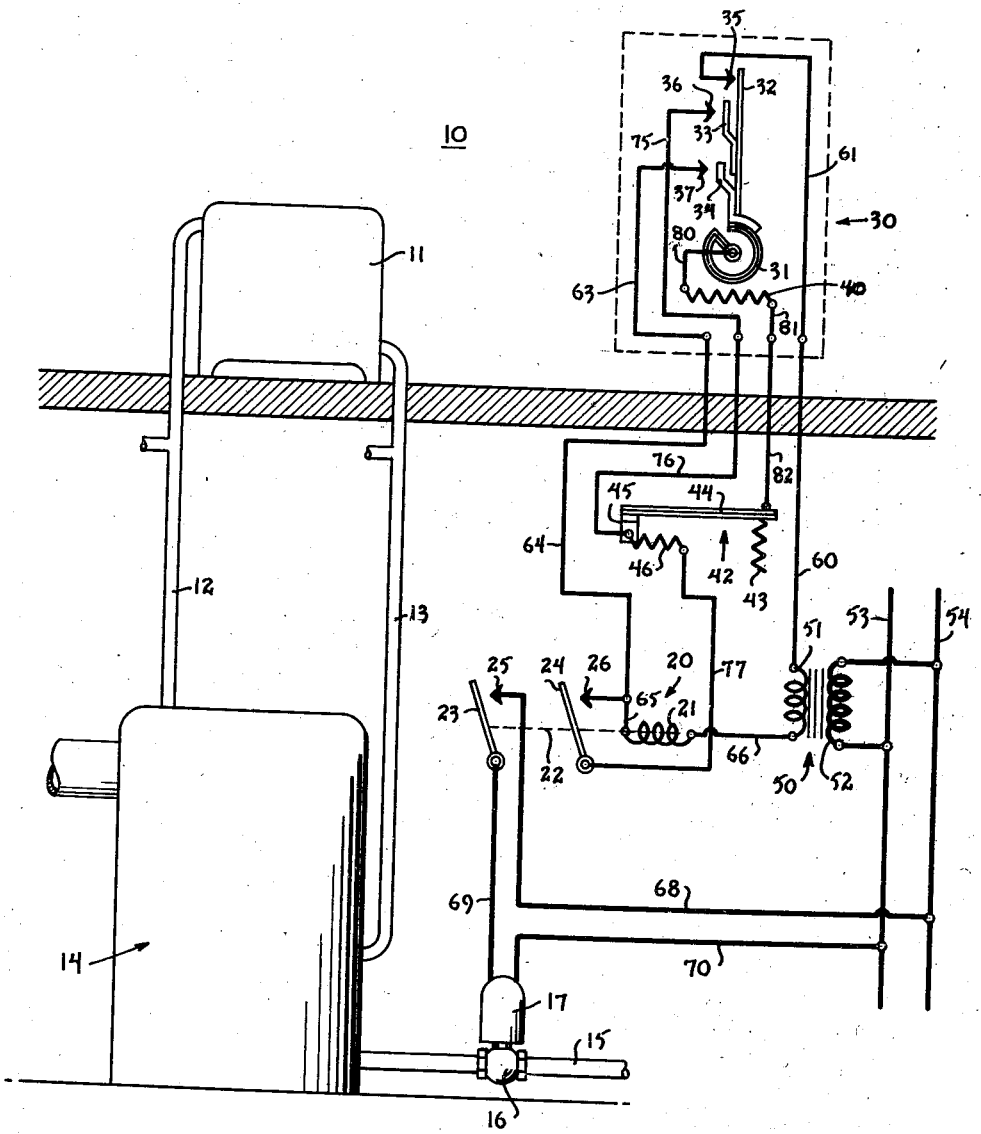
Inventor
Frederick E. Lange
By George H. Fisher
Attorney Patented July 15, 1941

2,249,215

UNITED STATES PATENT OFFICE 2,249,215

TEMPERATURE CONTROL SYSTEM

Frederick E. Lange, Minneapolis, Minn., assignor to Minneapolis-Honeywell Regulator Company, Minneapolis, Minn., a corporation of Delaware Application October 7, 1938, Serial No. 233,797

11 Claims. (Cl. 236—68)

This invention relates to a temperature control system and more particularly to a control system for a heating system.

It is well known that there is a definite time lag inherent in all heating systems. In other words, a definite time is required for heat to be supplied to the space being heated after the heating means therefor is placed in a heat increasing condition owing to the fact that a certain length of time is required for the generation of heat in the heating means and for the supply of this heat to the space so that the temperature of the space will not actually start to rise after the heating means is placed in the heat increasing condition for a length of time which will vary in accordance with the type of heating system. Thus this time lag is more pronounced in a hot water heating system than in a hot air heating system. Where a thermostat responsive to the temperature of the space controls the heating plant in such a manner that the heating plant is placed in the heat increasing condition until the temperature has risen to a desired value, the heat which is stored up in the heating system will continue supplying heat to the space and raise the temperature thereof for a length of time after the heating plant is shut down. The result of this is that the temperature of the space will continue to rise higher than the desired value so that the temperature is not maintained at an even value, thus causing discomfort to the occupants of the space.

In order to overcome this difficulty thermostats have been provided with electrical heating elements known as anticipating heaters to anticipate the arrival of heat in the space. Originally these heaters were energized upon a call for heat by the thermostat so that the thermostat would heat up more rapidly than the space temperature and shut down the heating plant before the temperature of the space actually reached the desired value so that the residual heat in the heating system would be just sufficient normally to bring the space temperature up to the desired value. Where this heating means is energized upon a call for heat however, the thermostat may heat up more rapidly than desired under certain conditions as following a night shut down period where the temperature is considerably below the desired value so that during the morning pick-up period a great many operations of the heating means will be necessary due to frequent shutdowns thereof because of this anticipating heater and thus requiring a great deal of time before the space temperature reaches a desired value. This difficulty has been overcome by providing means whereby the anticipating heater is not energized until the space temperature has actually started to rise above the temperature at which the thermostat calls for heat. In other words, if the thermostat calls for heat at 68° F. and becomes satisfied at 70° the heater adjacent thereto would not be energized until the space temperature had actually risen slightly above the 68° value. Where the heating load on the system is constant this arrangement proves very satisfactory. However, because the heating load does not remain constant this anticipating heater may supply too much heat to the thermostat during cold weather and not enough during warm weather. The reason for this is that the heat losses from the structure being heated are greater during cold weather than during warm weather so that over-shooting is more pronounced during warm weather because of the fact that the residual heat in the heating plant has a greater effect on the space where the heat losses are low.

In order to overcome this difficulty it has been proposed to vary the heating effect of the anticipating heater in accordance with outdoor temperatures. Thus as the temperature outdoors is low the heating effect of the heater will be less than when the temperature outdoors is high so that the heat given off thereby will be correct for different outdoor temperatures. This type of system does not however take into consideration variations in the heat load caused by factors other than outdoor temperature. It is well known that variations in the wind velocity, the sun effect, and variations in the internal heat load such as the number of occupants in the space, etc., also greatly affect the heating load on the heating system.

One of the objects of my invention is to provide means for adjusting the heater adjacent the thermostat in accordance with variations in the total heat load so that the correct amount of heat will be supplied to the thermostat regardless of variations in outdoor temperature, wind velocity, sun effect, etc. This may be accomplished by varying the heating effect of the thermostat heater in accordance with the rate at which the temperature of the space rises during operation of the heating plant since this rate will vary in accordance with variations in the total heating load on the system.

For a more complete description of the manner in which this is accomplished, reference is made to the accompanying drawing.

Referring more particularly to the drawing, a space 10 whose temperature is to be controlled is provided with a heating means 11 shown herein as a radiator through which a heating medium such as water or steam is circulated, this radiator being connected by pipes 12 and 13 to a furnace 14. This furnace may be heated in any suitable manner such as by oil, gas, or coal and for purposes of illustration it is illustrated herein as being a gas fired furnace, gas being supplied thereto by means of a pipe 15 under the control of a valve 16. The position of the valve 16 may be controlled by a solenoid 17 which is arranged to move the valve to open position when the solenoid is energized and to move the valve to a minimum or a closed position when the solenoid is deenergized.

The energization of the solenoid 17 may be controlled by a relay generally designated by the reference character 20. This relay is shown to comprise a relay coil 21, an armature 22 cooperating therewith and being connected to switch arms 23 and 24 which cooperate with the fixed contacts 25 and 26, respectively. Upon energization of the relay coil 21, the switch arms are moved into engagement with the cooperating contacts and upon deenergization of the relay coil the switch arms move out of engagement therewith under the influence of gravity or any suitable biasing means (not shown).

Located in the space 10 is a thermostat generally designated by the reference character 30. This thermostat is shown to comprise a bimetallic element 31 carrying the contact arms 32, 33, and 34 for movement towards and away from the fixed contacts 35, 36, and 37, respectively, in accordance with variations in temperature at the bimetallic element 31. These contacts are arranged to sequentially engage the fixed contacts as the temperature in the space falls and to move away from the fixed contacts in accordance with a rise in temperature at the bimetallic element 31 in the reverse order. Contact 32 is arranged to engage contact 35 first and contact 34 engages contact 37 last as the temperature in the space falls.

Located adjacent the bimetallic element 31 is a heater 40 which is arranged, when energized, to raise the temperature of the bimetallic element above the space temperature. This heating element may be located adjacent the bimetallic element as illustrated or if desired, may be wound around the bimetallic element to insure good heat transfer relationship.

Connected in series with the heating element 40 is an adjustable resistance indicated by the reference character 42. This adjustable resistance includes the resistance element 43 and an arm 44 arranged to move thereover so as to vary the resistance in series with the heater 40. The arm 44 is shown to comprise a bimetallic element fixed at one end at 45 and adjacent which, in heat transfer relationship therewith, is the electrical heating element 46. This heating element is arranged, when energized, to cause the bimetallic element 44 to move downwardly over the resistance 43 so as to increase the resistance in series with the heating element 40. This movement of the bimetallic element 44 will take place gradually so that the resistance in series with the heating element 40 will increase in accordance with the length of time that the heating element 46 is energized.

For supplying power to the thermostat heater 40 and the relay 20, a step-down transformer 50 is provided, this transformer including a low tension secondary 51 and a high tension primary 52 connected to line wires 53 and 54 which are in turn connected to a suitable source of power (not shown). The line wires 53 and 54 also serve to supply power to the solenoid 17 for controlling the valve 16.

With the parts in the positions illustrated the thermostat 30 is satisfied, or in other words, is not calling for heat within the space 10. In this position of the thermostat, the relay 20 is deenergized, as is the solenoid 17, so that the valve 16 is in its closed or minimum position so that little or no heat is being supplied to the heating medium which circulates through the radiator 11. The electrical heaters 40 and 46 are also deenergized and the bimetallic element 44 of the adjustable resistance 42 is relatively cool and is at the upper portion of the resistance 43 so that a minimum amount of resistance is in series with the heating element 40. As the temperature in the space begins to fall to 70°, for example, the contact arm 32 of the thermostat will engage the contact 35. As the temperature continues to fall to 68°, for example, the contacts 33 and 34 will engage the fixed contacts 36 and 37 sequentially and when all of the movable contacts of the thermostat are in engagement with the fixed contacts, power is supplied to the relay coil 21 as follows: from the transformer secondary 51 through conductors 60, 61, contact 35, contact arm 32, contact arm 34, contact 37, conductors 63, 64, 65, relay coil 21, and conductor 66 to the other side of secondary 51. Energization of the relay coil 21 causes movement of arms 23 and 24 into engagement with the fixed contacts 25 and 26, respectively. Power is now supplied to the solenoid 17 as follows: from the line wire 54 through conductor 68, contact 25, switch arm 23, conductor 69, solenoid 17, and conductor 70 to the line wire 53. Energization of the solenoid 17 causes valve 16 to open whereupon a maximum amount of fuel is supplied to the furnace and the heating medium therein begins to heat up and to circulate through the radiator 11 so as to supply heat to the space 10. Because of the fact that heaters 40 and 46 are shunted out by the above described circuit, no heat is supplied thereby to the bimetallic elements 31 and 44.

After a certain length of time, the temperature of the space will start to rise so that contact 34 of the thermostat will move out of engagement with the contact 37. The relay coil at this time remains energized through the following maintaining circuit, it being understood that arm 24 is now in engagement with contact 26, this maintaining circuit being as follows: from transformer secondary 51 through conductors 60, 61, contacts 35, 32, 33, and 36 of the thermostat, conductors 75, 76, heating element 46, conductor 77, switch arm 24, contact 26, conductor 65, relay coil 21, and conductor 66 to the other side of the secondary 51. It will now be understood that the relay 20 remains energized after contact 34 of the thermostat moves away from contact 37 through the holding circuit which includes the heating element 46 and since the original energizing circuit for the relay which was in parallel with this heating element has been broken at the thermostat, the heating element will begin to heat up and cause the bimetallic element 44 to flex downwardly so as to gradually increase the resistance in series with the heating element 40. The heating element 40 is shunted out by the above described circuit so that as long as the above described maintaining circuit, which includes the contacts 33 and 36, is energized no heat is given off to the thermostat by this heater 40.

Upon a rise in temperature of ½°, for example, whereupon the contact 33 of the thermostat moves out of engagement with the contact 36, the aforedescribed maintaining circuit for the relay which included the heater 46 is interrupted and the only maintaining circuit for the relay is now as follows: from the transformer secondary 51 through conductors 60, 61, contacts 35 and 32 of the thermostat through the bimetallic element 31, conductor 80, the heating element 40, conductors 81, 82, resistance 43, bimetallic element 44, resistance 46, conductor 77, switch arm 24, contact 26, conductor 65, relay coil 21, and conductor 66 to the other side of the secondary 51. The amount of resistance 43 that is in series with the heating element 40 will depend upon the length of time that heater 46 was energized or in other words, upon the length of time required for the space temperature to rise from 68° to 68½° which is an indication of the total heating load on the system. It should be noted that the heater 46 was shunted out until the temperature rose above 68° so that the heater 46 was not energized until the space temperature was actually starting to rise. The resistance in series with the heater 40 is therefore dependent upon the rate of rise of the space temperature, the slower this rate, the greater the heating load on the system, and the greater the amount of resistance in series with the heater 40 so that the heating effect of this heater varies inversely as the heating load on the system. Since the resistance value of the heater 40 is considerably greater than that of the heater 46, the heat given off by the heater 46 will now be substantially reduced since the only circuit through this heater includes the heater 40. The heat given off by the heater 46 at this time will be insufficient to cause further downward movement of the bimetallic element 44 but may be enough to maintain the bimetallic element in a substantially stationary condition so that during the time that heat is being supplied to the thermostat by the heater 40, the portion of the resistance 43 that is in circuit therewith will not change to any appreciable extent. The thermal element 44 may have a relatively large heat capacity so that slight variations in the amount of heat supplied thereto at this time will have little effect on the bimetallic element since it will cool slowly if at all and thus the heat given off by the heater 40 will remain substantially constant.

The temperature at the bimetallic element will now start to rise at a more rapid rate than the space temperature, thus anticipating the arrival of heat in the space and causing the temperature at the thermostat to rise to 70° before the space temperature actually reaches this value and causing the thermostat contact 32 to move away from the contact 35, thus deenergizing relay 20 and causing the fuel supply valve 16 to move back to its original closed or minimum position. Heaters 40 and 46 are at this time deenergized so that the bimetallic elements will both cool off, the bimetallic element 31 cooling down to the space temperature and the bimetallic element 44 cooling so that it again moves back to the original position illustrated. If the stored heat in the radiator 11 and the furnace 14 is sufficient to raise the space temperature to 70° the thermostat 30 will remain satisfied until the space temperature again starts to fall. After a certain lapse of time with the heating plant shut down the space temperature will gradually drop back to 68° whereupon the aforedescribed cycle of operation will take place. If during this time there is a variation in the heating load of the system due to any factor such as a change in the wind velocity or the sun effect, or the outside temperature, or the number of occupants in the space, the rate of rise in the space temperature will vary so that the time required for the space temperature to rise from 68° to 68½° will change and the position of the bimetallic element 44 with respect to the resistance 43 at the time that the contact 33 of the thermostat moves away from the contact 36 will vary accordingly, to properly change the heating effect of the heater 40 so that this change in the heating load is properly compensated for and the correct amount of heat is supplied to the thermostat in accordance with the particular heating load at any given time.

It should be noted that the heater 40 is not energized until the space thermostat has risen above 68½°, for example, or in other words, not energized until the space temperature is actually approaching the desired value so that during times such as the morning pick-up period short and frequent operations of the heating plant will not be required to bring the space temperature up to the desired value. Also due to the fact that heater 46 is not energized until the space temperature begins to rise and reaches a value above 68°, the total heat given off by this heater will vary directly in accordance with the actual rate of increase of heat in the space and will correctly measure the total heat load of the system which it not possible to do by the employment of merely an outside temperature responsive device for varying the heating effect of an anticipating heater in accordance solely with changes in outdoor temperature.

It should be understood of course that the values at which the contacts of the thermostat 30 open and close may be varied as desired and the temperatures referred to have been merely for purposes of illustration only. It should also be obvious that my invention is applicable to any type of heating system and that any suitable apparatus for controlling the heat generation of the heating apparatus may be employed, for example, the valve 16 and solenoid 17 might be replaced by motor operated check and draft dampers for a coal fired furnace, or an oil burner, or any other suitable apparatus.

While I have illustrated and described herein one preferred form of my invention it is obvious that the invention is susceptible to modifications by those skilled in the art and it should therefore be understood that my invention is limited only by the scope of the appended claims.

I claim as my invention:

1. In a system of the class described, a temperature changing means for a space, a space temperature responsive means in control of the temperature changing means and arranged to increase the temperature changing effect of the temperature changing means when the space temperature attains one predetermined value and to decrease the temperature changing effect thereof when the temperature to which the temperature responsive means is responsive attains a second predetermined value, temperature changing means adjacent the temperature responsive means and arranged, when in operation, to cause the temperature of the temperature responsive means to be maintained at a value different from the space temperature, means responsive to the attainment of a third predetermined temperature in the space which is between the first and second predetermined values for causing operation of the temperature changing means adjacent the temperature responsive means, and means responsive to the time required for the space temperature to vary from the first predetermined value to the third predetermined value after the temperature changing means begins to affect the space temperature for controlling the temperature changing effect of the temperature changing means adjacent the temperature responsive means.

2. In a system of the class described, a temperature changing means for a space, a space temperature responsive means in control of the temperature changing means and arranged to increase the temperature changing effect of the temperature changing means when the space temperature attains one predetermined value and to decrease the temperature changing effect thereof when the temperature to which the temperature responsive means is responsive attains a second predetermined value, temperature changing means adjacent the temperature responsive means and arranged, when in operation, to cause the temperature of the temperature responsive means to be maintained at a value different from the space temperature, means responsive to the attainment of a third predetermined temperature in the space which is between the first and second predetermined values for causing operation of the temperature changing means adjacent the temperature responsive means, and means responsive to the time required for the space temperature to vary from the first predetermined value to the third predetermined value after the temperature changing means begins to affect the space temperature for varying the temperature changing effect of the temperature changing means adjacent the temperature responsive means inversely as the length of such time.

3. In a system of the class described, a space heating means, thermostatic means responsive to the temperature of the space being heated in control of the heating means, said thermostatic means being arranged to increase the heating effect of the heating means when the temperature to which the temperature changing means responds drops to a predetermined value and to decrease the heating effect thereof when the temperature to which the temperature changing means responds rises to a second predetermined value, heating means adjacent said thermostatic means for raising the temperature thereof above the ambient temperature, means responsive to a rise in the space temperature to a third predetermined value between said first and second values for energizing said heating means adjacent said thermostatic means, and means responsive to the length of time required to raise the temperature of the space between two predetermined values after the space temperature has started to rise by reason of the increased heating effect of the space heating means for controlling the heating effect of the heating means adjacent the thermostatic means.

4. In a system of the class described, a space heating means, thermostatic means responsive to the temperature of the space being heated in control of the heating means, said thermostatic means being arranged to increase the heating effect of the heating means when the temperature to which the temperature changing means responds drops to a predetermined value and to decrease the heating effect thereof when the temperature to which the temperature changing means responds rises to a second predetermined value, heating means adjacent said thermostatic means for raising the temperature thereof above the ambient temperature, means responsive to a rise in the space temperature to a third predetermined value between said first and second values for energizing said heating means adjacent said thermostatic means, and controlling means for controlling the heating effect of said heating means, means operative between the time the space temperature starts to rise above said first predetermined value and a further predetermined value which is lower than the second predetermined value for adjusting said controlling means whereby the heating effect of the heating means adjacent the thermostatic means is varied inversely as the length of said time.

5. In a system of the class described, a space heating means, thermostatic means responsive to the temperature of the space being heated in control of said space heating means and arranged to increase the heating effect of the heating means when the temperature at said thermostatic means drops to one predetermined value and to decrease the heating effect of the heating means in response to a rise in temperature at said thermostatic means to a higher predetermined value, heating means adjacent said thermostatic means for raising the temperature thereof above the space temperature, means responsive to a rise in temperature in the space to a temperature between said first and second values to energize said heating means adjacent the thermostatic means, and means responsive to the total heating load on the system for controlling the heating effect of said last named heating means.

6. In a system of the class described, a space heating means, thermostatic means responsive to the temperature of the space being heated in control of said space heating means and arranged to increase the heating effect of the heating means when the temperature at said thermostatic means drops to one predetermined value and to decrease the heating effect of the heating means in response to a rise in temperature at said thermostatic means to a higher predetermined value, heating means adjacent said thermostatic means for raising the temperature thereof above the space temperature, means responsive to a rise in temperature in the space to a temperature between said first and second values to energize said heating means adjacent the thermostatic means, and means responsive to the rate in rise in temperature in the space by the space heating means for controlling the heating effect of the heating means adjacent the thermostatic means.

7. In a temperature changing system, a space temperature changing means, thermostatic means responsive to the space temperature in control of the temperature changing means, said thermostatic means being arranged to increase and decrease the temperature changing effect of the temperature changing means in response to different temperatures at the thermostatic means, means operative to change the temperature at the thermostatic means at a more rapid rate than that at which the space temperature is changed by the space temperature changing means, means delaying action of said last named temperature changing means until the space temperature changing means has caused a change in the space temperature to a predetermined value, and means responsive to the rate of change of the space temperature by the space temperature changing means to control the temperature changing effect of the last named temperature changing means.

8. In a system of the class described, a space heating means, thermostatic means responsive to the temperature of the space being heated in control of the heating means, said thermostatic means being arranged to increase the heating effect of the heating means when the temperature to which the temperature changing means responds drops to a predetermined value and to decrease the heating effect thereof when the temperature to which the temperature changing means responds rises to a second predetermined value, electrical heating means adjacent said thermostatic means for raising the temperature thereof above the ambient temperature, means responsive to a rise in the space temperature to a third value between said first and second values for energizing said electrical heating means, adjustable resistance means in series with said electrical heating means for controlling the heating effect thereof, and means responsive to the rate of rise in the space temperature by the space heating means for controlling said adjustable resistance means.

9. In a system of the class described, a space heating means, thermostatic means responsive to the temperature of the space being heated in control of the heating means, said thermostatic means being arranged to increase the heating effect of the heating means when the temperature to which the temperature changing means responds drops to a predetermined value and to decrease the heating effect thereof when the temperature to which the temperature changing means responds rises to a second predetermined value, electrical heating means adjacent said thermostatic means for raising the temperature thereof above the ambient temperature, means responsive to a rise in the space temperature to a third value between said first and second values for energizing said electrical heating means, adjustable resistance means in series with said electrical heating means for controlling the heating effect thereof, and means for gradually increasing the value of the adjustable resistance from an initial minimum value from the time the space temperature starts to rise above the first predetermined value until the space temperature reaches said third value whereby the heating effect of the electrical heating means varies inversely as the rate of rise of the space temperature.

10. In a system of the class described, a space temperature responsive means including first, second and third movable contacts movable sequentially in response to falling temperatures adjacent thereto into engagement with first, second and third fixed contacts, respectively, electrical heating means adjacent said temperature responsive means and arranged, when energized, to raise the temperature thereof above the ambient temperature, space heating means, adjustable resistance means in series with said electrical heating means, means responsive to engagement of all of said movable contacts with the respective fixed contacts for causing an increase in the heating effect of the space heating means, means responsive to disengagement of the third movable contact and the respective fixed contact for causing operation of the adjustable resistance means to gradually increase the resistance thereof, circuit connections operative in response to disengagement of the second movable contact with the co-operating fixed contact for causing energization of the electrical heating means, and means for maintaining the space heating means in heat increasing condition until all of the movable contacts have moved away from the cooperating fixed contacts.

11. In a system of the class described, a space heating means, thermostatic means responsive to the temperature of the space being heated in control of the heating means, said thermostatic means being arranged to increase the heating effect of the heating means when the temperature to which the temperature changing means responds drops to a predetermined value and to decrease the heating effect thereof when the temperature to which the temperature changing means responds rises to a second predetermined value, heating means adjacent said thermostatic means for raising the temperature thereof above the ambient temperature, means responsive to a rise in the space temperature to a third predetermined value between said first and second values for energizing said heating means adjacent said thermostatic means, and means responsive to the time required for the space temperature to increase from the first predetermined value to the third predetermined value after the heating effect of the space heating means is increased for controlling the heating effect of the heating means adjacent the thermostatic means.

FREDERICK E. LANGE.